(No Model.)

G. A. ANDERSON.
COMPENSATING GEAR.

No. 555,295. Patented Feb. 25, 1896.

Witnesses

Inventor
Gustaf A. Anderson
By Attorney Herbert W. T. Jenner

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

COMPENSATING GEAR.

SPECIFICATION forming part of Letters Patent No. 555,295, dated February 25, 1896.

Application filed August 10, 1895. Serial No. 558,928. (No model.)

*To all whom it may concern:*

Be it known that I, GUSTAF ARVID ANDERSON, a subject of the King of Sweden and Norway, residing at Waynesborough, in the county of Franklin and State of Pennsylvania, have invented certain new and useful Improvements in Compensating Gear; and I do hereby declare the following to be a full, clear, and exact description of the invention, such as will enable others skilled in the art to which it appertains to make and use the same.

This invention relates to compensating gear; and it consists in the novel construction and combination of the parts hereinafter fully described and claimed.

Figure 2:
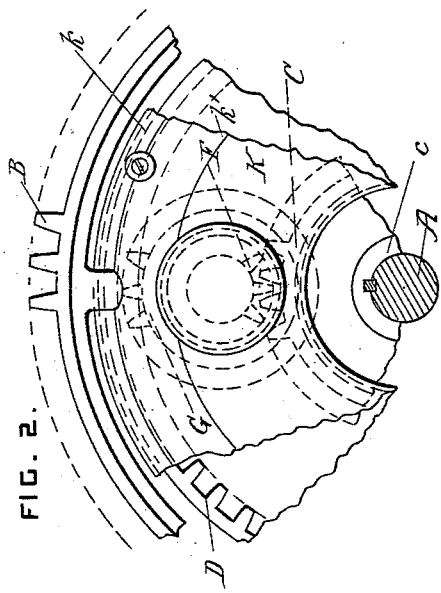
Figure 3:
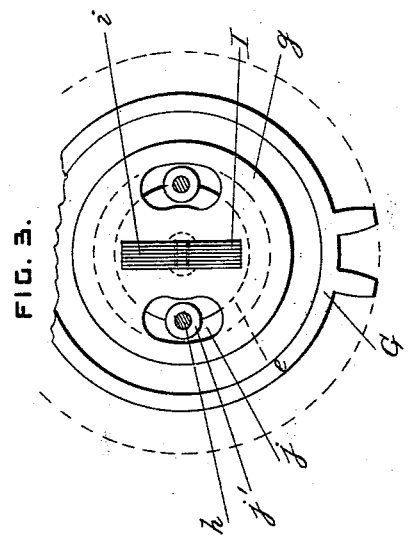
Figure 1:
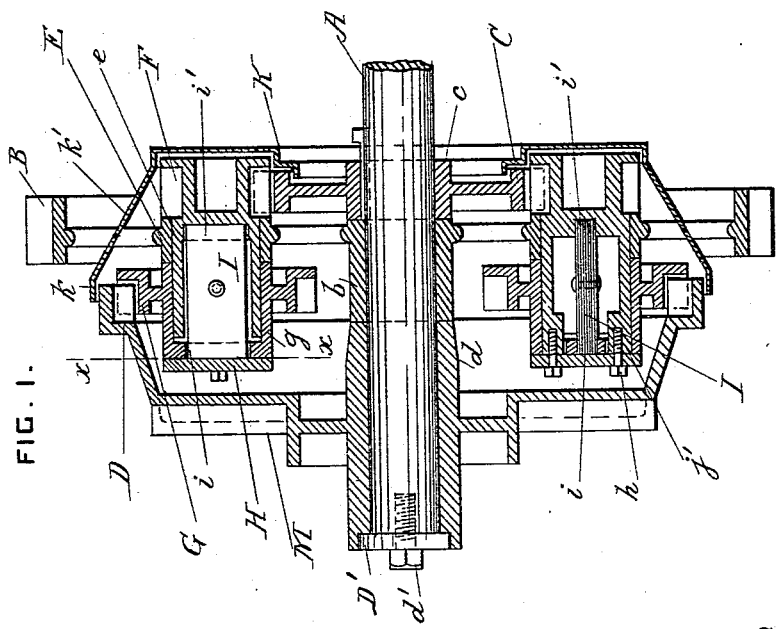

In the drawings, Figure 1 is a longitudinal section through a compensating gear constructed according to this invention. Fig. 2 is a side view of a portion of the compensating gear with the casing removed. Fig. 3 is a cross-section taken on the line $x\ x$ in Fig. 1.

A is the shaft upon which the compensating gear is supported. This shaft is journaled in bearings of approved construction which are not shown in the drawings.

B is a driving-wheel provided with a hub $b$, which is journaled on the shaft A.

C is an external toothed wheel provided with a hub $c$, which is secured on the shaft A on one side of the driving-wheel B.

D is an internal toothed wheel provided with a hub $d$, which is journaled on the shaft A on the other side of the wheel B.

D' is a plate secured to the end of the shaft A by the bolt $d'$ and operating to retain the wheels D and B on the said shaft.

The wheel B is provided with a bearing E on one of its arms or web-plate, and $e$ is a hollow sleeve journaled in the said bearing parallel with the shaft A.

F is a toothed pinion formed integral with one end of the sleeve $e$, or otherwise secured to it, and gearing into the said toothed wheel C.

G is a toothed pinion larger in diameter than the pinion F, and provided with a hub $g$, which is slid on the other end of the sleeve $e$ from the pinion F.

H is a plate extending over the end of the hub $g$, and $h$ are bolts which secure the plate H to the end of the sleeve $e$, and thereby keep the hub $g$ on the said sleeve, and the sleeve $g$ in the bearing E. The pinion G has a rectangular socket $i$ in the end of its hub $g$ next to the plate H, and $i'$ is a rectangular socket in the end of the sleeve $e$ next to the pinion F.

I is a metallic spring coupling together the pinions F and G. This spring preferably consists of a series of steel plates or laminæ, loosely held together by a rivet, and having their ends fitted into the sockets $i$ and $i'$. The end of the hub $g$ has openings $j$ at the sides of the socket $i$, and $j'$ are bosses on the end of the sleeve $e$, which project through the said openings and bear against the plate H. The openings $j$ are long enough to permit the bosses to move back and forth in them circumferentially for a little distance.

K is a cover for the gearing. This cover is made in two parts $k$ and $k'$. The part $k$ encircles the internal wheel D and extends in conical form to the arms of the driving-wheel B. The other part, $k'$, extends from the arms of the driving-wheel over the teeth of the wheel C. The two parts $k$ and $k'$ are provided with bosses and are clamped together and to the arms of the driving-wheel in any approved manner.

The pinions F and G are duplicated at different points of the driving-wheel, four sets of pinions arranged equidistant from each other being preferably used. The object of duplicating the pinions is to distribute the strain upon the wheels C and D and to permit them to be made with smaller and lighter teeth. The object of interposing springs between the pinions F and G is to distribute the strain uniformly over all the teeth in gear at the same time, making each tooth bear an equal amount of pressure and neutralizing the slight differences due to unavoidable imperfections in the spacing of the teeth.

The power is transmitted from the shaft A and from the hub $d$ of the internal wheel D. This compensating gear is specially adapted for use in a traction-engine, and M is a portion of the hub of one of the road-wheels of the traction-engine. The portion M is shown cast integral with the hub $d$. The shaft A is the rear axle of the engine, and the hub of the other road-wheel, which is not shown in the drawings, is secured on the other end of the axle.

The wheels C and D and the pinions F and G are proportioned so as to equalize the resistances, and as long as the engine proceeds along a straight road the road-wheels are driven by the driving-wheel B with equal speed. When the traction-engine turns a corner, the road-wheels are moved at unequal speeds inversely in proportion to the resistances to which they are subjected.

In a larger form of traction-engine the driving-wheel B may be the counter gear-wheel of the engine. The shaft A is then the counter-shaft, and the power is transmitted, through two toothed wheels of approved construction secured respectively to the hub $d$ and to the shaft A, to two toothed wheels on the axle of the road-wheels.

What I claim is—

1. In a compensating gear, the combination, with an external and an internal toothed wheel, of two toothed pinions gearing respectively into the said wheels, and a spring operatively connecting the said pinions, substantially as set forth.

2. In a compensating gear, the combination, with a shaft, and a driving-wheel, an external toothed wheel, and an internal toothed wheel, all mounted on the said shaft; of two toothed pinions journaled in a bearing carried by the said driving-wheel and gearing respectively into the said external and internal wheels, and a spring interposed between the two said pinions and transmitting the motion from one to the other, substantially as set forth.

3. In a compensating gear, the combination, with a shaft, of a driving-wheel journaled thereon and provided with a bearing parallel with the said shaft, two toothed pinions carried by the said bearing, a spring interposed between the said pinions and transmitting the rotary motion from one to the other, and an internal and an external toothed wheel supported by the said shaft on opposite sides of the said driving-wheel and gearing respectively into the said pinions, substantially as set forth.

4. In a compensating gear, the combination, with a driving-wheel provided with a bearing parallel with its axis, of two toothed pinions carried by the said bearing, toothed wheels gearing into the respective pinions, and a spring operatively connecting the said pinions, substantially as set forth.

5. In a compensating gear, the combination, with a driving-wheel provided with a bearing parallel with its axis, of a toothed pinion provided with a sleeve journaled in the said bearing, a toothed pinion journaled on the said sleeve, toothed wheels gearing into the respective pinions, and a spring operatively connecting the two said pinions, substantially as set forth.

6. In a compensating gear, the combination, with a driving-wheel provided with a bearing parallel with its axis, of a toothed pinion provided with a hollow sleeve journaled in the said bearing, a toothed pinion journaled on the projecting end of the said sleeve, toothed wheels gearing into the respective pinions, and a spring contained within the said sleeve and operatively connecting the two said pinions, substantially as set forth.

7. In a compensating gear, the combination, with a driving-wheel provided with a bearing parallel with its axis, of a toothed pinion provided with a hollow sleeve journaled in the said bearing and having a rectangular socket at the end of the sleeve next to the pinion, a toothed pinion journaled on the end of the said sleeve and provided with a rectangular socket, toothed wheels gearing into the respective pinions, and a flat metallic spring engaging with the said sockets and operatively connecting the two said pinions, substantially as set forth.

8. In a compensating gear, the combination, with a bearing, of a toothed pinion provided with a hollow sleeve journaled in the said bearing and having a rectangular socket at one end next to the pinion and projecting bosses at the other end, a pinion journaled on the said sleeve and provided with a rectangular socket and openings for clearing the said bosses, toothed wheels gearing into the respective pinions, a flat metallic spring engaging with the said sockets and operatively connecting the said pinions, and a plate secured to the said bosses and retaining the said pinions in position, substantially as set forth.

In testimony whereof I affix my signature in presence of two witnesses.

GUSTAF ARVID ANDERSON.

Witnesses:
DANIEL S. BEARD,
E. D. FAHRNEY.